United States Patent
Chatterjee

(10) Patent No.: US 10,511,690 B1
(45) Date of Patent: Dec. 17, 2019

(54) METHOD AND APPARATUS FOR PREDICTING EXPERIENCE DEGRADATION EVENTS IN MICROSERVICE-BASED APPLICATIONS

(71) Applicant: INTUIT INC., Mountain View, CA (US)

(72) Inventor: Shreeshankar Chatterjee, San Diego, CA (US)

(73) Assignee: INTUIT, INC., Mountain View, CA (US)

( * ) Notice: Subject to any disclaimer, the term of this patent is extended or adjusted under 35 U.S.C. 154(b) by 121 days.

(21) Appl. No.: 15/899,625

(22) Filed: Feb. 20, 2018

(51) Int. Cl.
| | |
|---|---|
| *G06F 15/173* | (2006.01) |
| *H04L 29/08* | (2006.01) |
| *H04L 12/26* | (2006.01) |
| *G06K 9/62* | (2006.01) |
| *H04L 12/24* | (2006.01) |

(52) U.S. Cl.
CPC .......... *H04L 67/322* (2013.01); *G06K 9/6223* (2013.01); *G06K 9/6269* (2013.01); *H04L 41/069* (2013.01); *H04L 43/16* (2013.01)

(58) Field of Classification Search
CPC ... G06F 11/34; G06F 8/60; G06F 9/50; H04L 41/0654; H04L 41/0677
See application file for complete search history.

(56) References Cited

U.S. PATENT DOCUMENTS

| | | | |
|---|---|---|---|
| 9,875,086 B1 * | 1/2018 | Anderson | G06F 11/34 |
| 2018/0225320 A1 * | 8/2018 | Saini | G06F 16/215 |
| 2019/0068696 A1 * | 2/2019 | Sen | H04L 63/0428 |
| 2019/0138643 A1 * | 5/2019 | Saini | G06F 16/248 |
| 2019/0199626 A1 * | 6/2019 | Thubert | H04L 45/64 |
| 2019/0238399 A1 * | 8/2019 | Perreira | G06F 11/0709 |

* cited by examiner

*Primary Examiner* — Umar Cheema
*Assistant Examiner* — Gregory P Tolchinsky
(74) *Attorney, Agent, or Firm* — Patterson & Sheridan, LLP

(57) ABSTRACT

Techniques are disclosed to predict experience degradation in a microservice-based application comprising a plurality of microservices. Quality of service metrics are derived for each node from the historical event log data of nodes forming a plurality of directed acyclic graph (DAG) paths in the multiple-layer nodes. A clustering model clusters the plurality of quality of service metrics according to multiple levels of quality of experience and determines respective value ranges of each quality of service metric for the multiple levels of quality of experience. Each quality of service metric is labeled with one of the multiple levels of quality of service according to the respective value ranges. A support vector machine model predicts various experience degradation events which are expected to occur during the operation of the microservice-based application.

16 Claims, 7 Drawing Sheets

METHOD AND APPARATUS FOR PREDICTING EXPERIENCE DEGRADATION EVENTS IN MICROSERVICE-BASED APPLICATIONS

BACKGROUND

Field

Embodiments presented herein generally relate to techniques for predicting various experience degradation events which are may occur during the operation of microservice-based applications.

Description of the Related Art

It has recently become popular to build web applications services upon a microservice architecture. A microservice architecture is a service-oriented architectural style that structures a complex application as a collection of loosely-coupled, independent services. The benefits of the microservice structure include modularity and continuous delivery and deployment without adversely affecting other microservices.

Each microservice can communicate with other microservices using, for example, a hypertext transfer protocol (HTTP) resource application programming interface (API). Rapidly growing traffic among microservices may put serious pressure on the microservice architecture, and consequently may cause experience degradation during a service offered by a microservice-based application. Thus, there is need for methods and apparatuses for predicting experience degradation events in order to maintain quality of service during the operation of microservice-based applications.

SUMMARY

One embodiment presented herein includes a method for predicting experience degradation in a microservice-based application comprising a plurality of microservices. The method includes obtaining historical event log data associated with a plurality of nodes forming a plurality of directed acyclic graph (DAG) paths, wherein each respective DAG path of the plurality of DAG paths provides a respective online service; deriving a plurality of quality of service metrics for each node of the plurality of nodes from the historical event log data; clustering the plurality of quality of service metrics with a clustering algorithm to create a plurality of quality of service metrics clusters; determining value ranges of each quality of service metric cluster for the multiple levels of quality of experience and labeling each of the plurality of quality of service metrics as one of the multiple levels of quality of experience according to the respective value ranges; training a support vector machine model to construct a hyperplane to classify the labeled quality of service metrics into two or more classes; and predicting at least one experience degradation event being expected to occur during operation of the microservice-based application, using the support vector machine model.

Another embodiment presented herein includes an apparatus for predicting experience degradation in a microservice-based application comprising a plurality of microservices. The apparatus includes a memory comprising executable instructions, and a processor in data communication with the memory. The processor is configured to execute the executable instructions that, when caused, to cause the apparatus to obtain historical event log data associated with a plurality of nodes forming a plurality of directed acyclic graph (DAG) paths, wherein each respective DAG path of the plurality of DAG paths provides a respective online service; derive a plurality of quality of service metrics for each node of the plurality of nodes from the historical event log data; cluster the plurality of quality of service metrics with a clustering algorithm to create a plurality of quality of service metrics clusters; determine value ranges of each quality of service metric cluster for the multiple levels of quality of experience and labeling each of the plurality of quality of service metrics as one of the multiple levels of quality of experience according to the respective value ranges; train a support vector machine model to construct a hyperplane to classify the labeled quality of service metrics into two or more classes; and predict at least one experience degradation event being expected to occur during operation of the microservice-based application, using the support vector machine model.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope as the disclosure may admit to other equally effective embodiments.

DETAILED DESCRIPTION

Embodiments presented herein provide techniques for predicting various experience degradation events that may occur during the operation of microservice-based applications.

Microservice architecture refers to a service-oriented architecture (SOA) that executes a specific function and communicates through a functional interface, such as an application programming interface (API). Microservice architecture decomposes a complex and large-scale application into modular services, which communicate through APIs and other well-defined interfaces. Microservice architecture brings many benefits, including: reduction of the number of points of failure; a structure that enables multiple teams to work concurrently on the same application; continuous delivery and deployment; and scalability.

The performance of applications supported by microservices is tied to the underlying performance of the microservices. In some cases, a single microservice may support many applications at once. As such, confluence of events may put significant burdens on some microservices and not others. When a microservice is overloaded or otherwise not performing optimally, it may lead to a degradation in the service provided by the supported application. For example, a user may experience slower performance from the application or errors in the application's output. In the worst case scenario, a single overtaxed or otherwise dysfunctional microservice may negatively affect more than one application that is supported by the microservice.

In order to improve the experience of users of applications that rely on microservices, it is possible to collect performance data and build models to monitor the performance of micoservices in order to predict potential service degradation issues. For example, quality of service (QoS) metrics may be collected and analyzed to form an objective performance assessment of any particular microservice. The microservices may be further organized by paths taken by an application user through the various microservices while using the application. Thereafter, the QoS metrics may be clustered in order to gain insights on the performance of the various microservices and paths. Finally, the clustering output may be used in conjunction with a predictive model in order to predict performance degradations that may lead to quality of experience (QoE) degradation. In this way, not only may QoE degradations be avoided by taking proactive action based on a prediction of a microservice issue, leading to a better use experience, but the interplay of microservices supporting application may be optimized to avoid functional issues in the first place.

Figure 1:
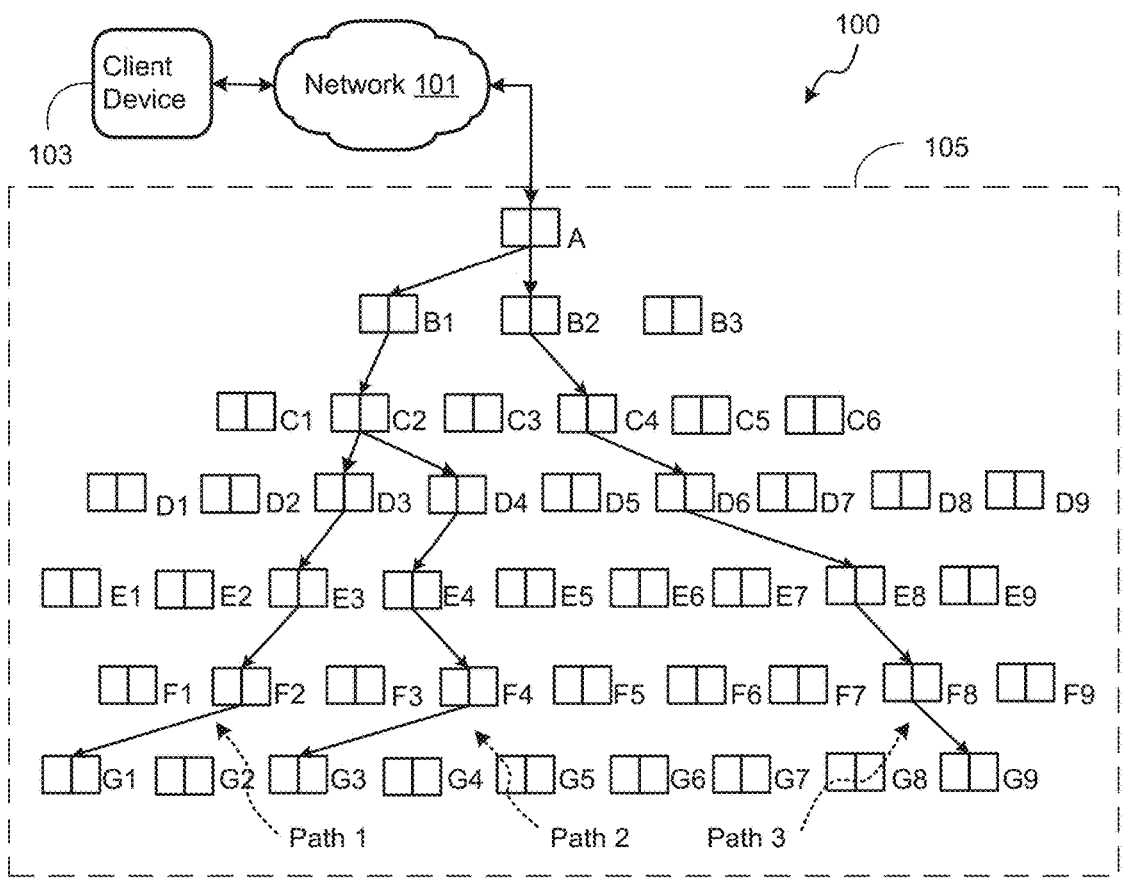
FIG. 1 depicts an exemplary schematic diagram of a computing environment where a distributed microservice-based application is implemented in accordance with aspects of the present disclosure.

FIG. 1 illustrates an exemplary schematic diagram of a computing environment for operating a microservice-based application 105 in accordance with one aspect of the present disclosure.

As illustrated, one or more client devices 103 connect via network 101 to a microservice-based application 105. The network 101 may be a wide area network (WAN), local area network (LAN), wireless LAN (WLAN), personal area network (PAN), a cellular network, etc. In one embodiment, the network 101 is the Internet.

Client device 103 comprises a physical or virtual computing entity, such as a mobile device, a cellular phone, a smart phone, a tablet, a laptop computer, a desktop computer, a personal digital assistant (PDA), or any computing system that can execute software applications. Client device 103 includes a web browser to access a web service offered by the microservice-based application.

The microservice-based application 105 comprises a collection of distributed microservices, each supported by one or more nodes executing software to provide a respective microservice. Each respective microservice is associated with a virtual address, and the virtual address is mapped to a physical addresses of each node related to respective mircroservices. With these virtual and/or physical addresses, requests for a particular microservice can be addressed to a node supporting the particular microservice.

In the embodiment depicted in FIG. 1, the microservice-based application 105 includes a hierarchy of nodes organized into levels, starting from A-level nodes to G-level nodes. In this example, the hierarchy starts from a root node, node A, and expands to the leaf nodes, nodes G1 through G9.

In one embodiment, node A may be an API gateway that receives requests (i.e., queries composed in a user interface) from the client device 103 and then routes the requests to appropriate microservices. In such an example, the API gateway merges responses received from the microservices and provides the merged response to the client device 103. B-layer nodes include node B1 through node B3, C-layer nodes include node C1 through node C6, D-layer nodes include node D1 through node D9, E-layer nodes include node E1 through node E9, F-layer nodes include node F1 through node F9, and G-layer nodes include node G1 through node G9. Each of these nodes may support respective microservices, such as encryption/decryption service, database services, entitlement services, subscription services, billing services, payment services and so on.

Each node in FIG. 1 can interact with each other node over a communications network using standard protocols (e.g., TCP/IP) and APIs. APIs generally expose various routines and methods to software developers for use in obtaining and modifying data using features of a software application. These APIs may be accessible programmatically (e.g., as function calls programmed in an application or function library) or via a web resource for web-based applications. APIs couple the microservices with one another such that each microservice can be updated and deployed independent of other microservices of the application. In one embodiment, each node in a microservice-based application can invoke functionality exposed by an API using a Representational State Transfer function call (i.e., a RESTful function call). A RESTful call generally uses HTTP requests to invoke a function exposed by a web-based API and provides data to the invoked function for processing. In other cases, each node can invoke API functions using queries encapsulated in an HTTP POST request, a Simple Object Access Protocol (SOAP) request, or other protocols that allow client software to invoke functions.

The microservice-based application 105 may include a plurality of paths comprising a series of nodes and their interconnecting edges for providing various services. In one embodiment, each of the plurality of paths forms a directed acyclic graph (DAG), which does not contain any cycle or loop (i.e., never returns to a node after traversing it). For example, DAG path 1 travels through node A→node B1→node C2→node D3→node E3→node F2→node G1. DAG path 2 goes through node A→node B2→node C2→node D4→node E4→node F4→node G4. DAG path 3 consists of: node A→node B1→node C2→node D3→node E3→node F2→node G1. Notably these paths are just some examples and many others are possible.

In one embodiment, DAG path 1 may be a work flow for providing an online content service, such as a multimedia streaming service. As described above, all requests transmitted from the client device 103 first pass through node A (i.e., the API gateway), which routes the requests to appropriate microservices based on parameters in the request. For example, to subscribe to an online content service, the client device 103 sends a login request to node A, which routes the login request to node B1, which in this example provides an authentication and user identification service. Once node B1 authenticates a user's identification, node C2 provides an entitlement process for confirming whether the authenticated user is authorized to receive the multimedia streaming service. Node D3 provides a user interface that allows a user to search and select a particular multimedia content item. Node E3 provides a billing service that maintains billing account information associated with a selected content for each user. Node F2 provides a payment service offering a plurality of payment options to facilitate a payment transaction between the user and a multimedia content provider. Node G1 provides an online transmission service for transmitting the selected online content to the user through an internet network.

In another embodiment, DAG path 2 may be a workflow for providing a transaction categorization service as one of example of a microservice-based service. The transaction categorization service may automatically categorize a user's transactions into customized groups, such as "grocery" or "gas" expenses, "educational" expenses, "medical" expenses, and so on. The transaction categorization service requires a login, user identification and user entitlement processes. Thus, the transaction classification service shares the nodes of A→B1→C2 with DAG path 1, but then diverges path to a unique path D4→E4→F4→G3 for categorizing the user transactions into the customized groups, and displaying categorized transactions to a user.

In another embodiment, DAG path 3 may be a customer search service. DAG path 3 does not share any nodes with other DAG paths 1 and 2 except node A. DAG paths are not limited to these examples, and many other online services may be offered by microservice-based applications.

Figure 2:
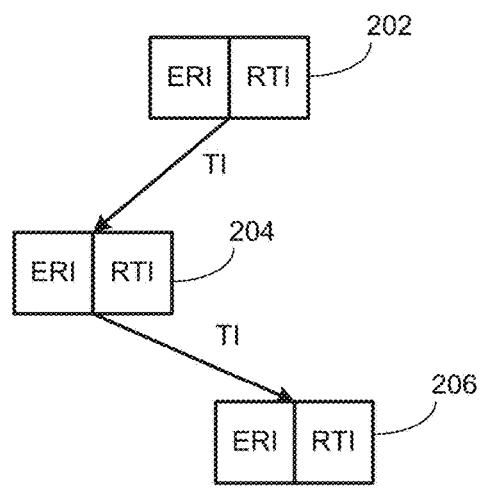
FIG. 2 is an exemplary schematic diagram illustrating quality of service metrics of nodes and edges in accordance with aspects of the present disclosure.

FIG. 2 is an exemplary schematic diagram for illustrating quality of service metrics related to nodes and edges (e.g., of a microservice) in accordance with one aspect of the present disclosure.

A microservice-based application, (e.g., application 105 in FIG. 1) may keep event logs for each node to record event information, such as: timestamps of each event, types of API requests (e.g., POST, PUT, GET, and DELETE), whether each API request was successfully processed, and/or processing times (e.g., a response time) of API requests. Based on these logs, the microservice-based application 105 may derive one or more quality of service metrics for each node and edge based on respective event logs of each node forming respective DAG paths.

In some example, each node 202, 204, 206 has a response time index (RTI) and error rate index (ERI), and its edge has a throughput index (TI), all of which may be considered as quality of service metrics. In some example, these metrics may be used to measure quality of a service and conversely any degradation of that service quality, which may be referred to generally as experience degradation. In general, the higher an RTI and an ERI, the higher the experience degradation, and the lower a TI, the higher the experience degradation.

In the example depicted in FIG. 2, response time index (RTI) provides a guideline for how quickly a node provides an API response to an API request. In one example, RTI is calculated by: response time index (RTI)=TP90t/TP90base, where TP90t is a 90th percentile response time at time t and TP90base is a baseline response time within which a node must respond in at least 90 percent of all responses. Baseline response times such as this example may be defined in a service level agreement (SLA). For example, the SLA may define 200 milliseconds for the baseline response time for at least 90 percent of the responses coming from a particular node (e.g., microservice). The 90 percentile response time is merely an example, and any other number such as 80, 85, 95 or 98 percentile can be used. Thus, the response time index may act as a relative metric of the current response times at time t as compared to a baseline, such as set by an SLA. Thus, in this example, if the response time index is greater than 1, it means that the response times are above a threshold performance level, such as defined by an SLA. This is generally a case that may lead to service degradation. If, on the other hand, the response time index is less than or equal to 1, it means that the response times are generally below the applicable threshold and that service should be according to design.

In the example depicted in FIG. 2, the error rate index (ERI) suggests an error rate of API traffic between two communicating nodes. In one example, error rate index is calculated by: error rate index (ERI)=$ER_t$/ERbase, where ERt is an error rate at a particular node at time t, and ERbase is a baseline error rate as defined, for example, in an SLA. For example, the SLA may define 1% as the baseline error rate. An error rate at node B1 is 0.7% at time t, then the $ERI_t$ is 0.7 (=0.7%/1%). As above, the error rate index may act as a relative metric of the error rates at time t as compared to a baseline, such as set by the SLA. Thus, in this example, if the error index is greater than 1, it means that the error rates are above a threshold performance level, such as defined by the SLA. This is generally a case that may lead to service degradation. If, on the other hand, the error rate index is less than or equal to 1, it means that the error rates are generally below the applicable threshold and that service should be according to design.

In the example depicted in FIG. 2, the throughput index (TI) indicates an amount of traffic (e.g., API traffic) between two communicating nodes. In one example, the throughput index is calculated by: throughput index $TI_t$=THRt/THRbase, where in this example THRt is a measure of successful transactions per second (e.g., API transactions) from a previous node to a next node at time t, and THRbase is a measure of successful transactions per second defined as a baseline throughput. As above, such a baseline may be defined, for example, in an SLA. For example, an SLA may define 200 transactions per second (TPS) as the baseline throughput (THRbase). Here again, the throughput index may act as a relative metric of the throughput at time t as compared to a baseline, such as set by the SLA. Thus, in this example, if the throughput index is less than 1, it means that the throughput is below a threshold performance level, such as defined by the SLA. This is generally a case that may lead to service degradation. If, on the other hand, the error rate index is greater than or equal to 1, it means that the throughput is generally above the applicable threshold and that service should be according to design.

Microservice quality of service metrics, such as RTI, ERI and TI, may be associated with one of multiple quality of service (QoS) levels according to the severity of an experience degradation.

In some examples, a data structure for reporting microservice quality of service metrics may include metric values (e.g., for ERI, RTI and TI) as well as associated QoS levels, such as: {ERI: [Value, Level], RTI: [Value, Level], TI: [Value, Level]}. For example, the associated levels may be "normal", "pre-warning", and "warning." Others are possible. Notably, this is just one way in which to encapsulate the microservice quality of service metrics and many other are possible.

As above, the multiple QoS levels may include, for example, a normal level or green status, which may refer to no or low severity QoS statuses; a pre-warning level or yellow status, which may refer to an intermediate severity QoS status; and a warning level or red status, which may refer to a high severity QoS status. In other embodiments, there may be other QoS levels, including other numbers of levels, such as two, four or more levels. In some examples, each service levels may be determined based on quality of service (QoS) requirements defined in a service level agreement (SLA).

To measure quality of experience (QoE), the microservice-based application 105 may derive one or more quality of service metrics, such as those described above, for each node and edge based on respective event logs of each node forming respective DAG paths. For example, a higher RTI or ERI, or a lower TI, may lead to degraded Quality of Experience (QoE) because a user may experience slower or more error-prone performance out of a service supported by the microservice-based architecture.

Figure 3A:
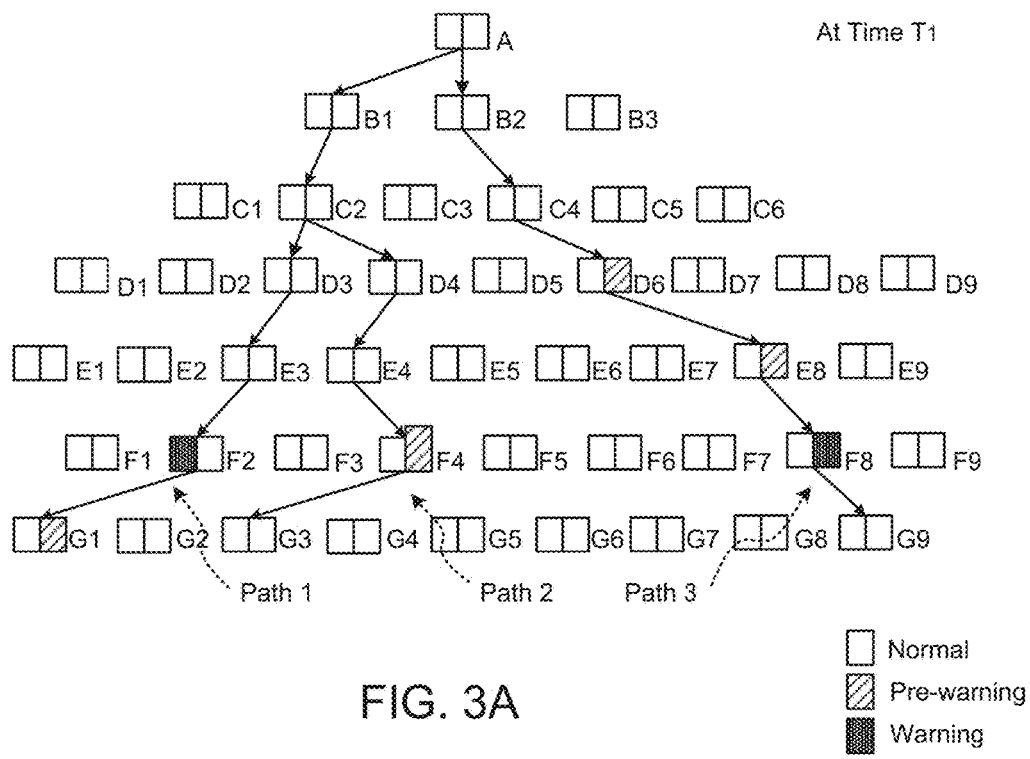
FIGS. 3A to 3C depict exemplary changes of quality of service metrics of nodes on DAG paths in a microservice-based application from time $t_1$ through time $t_3$ in accordance with aspects of the present disclosure.
Figure 3B:
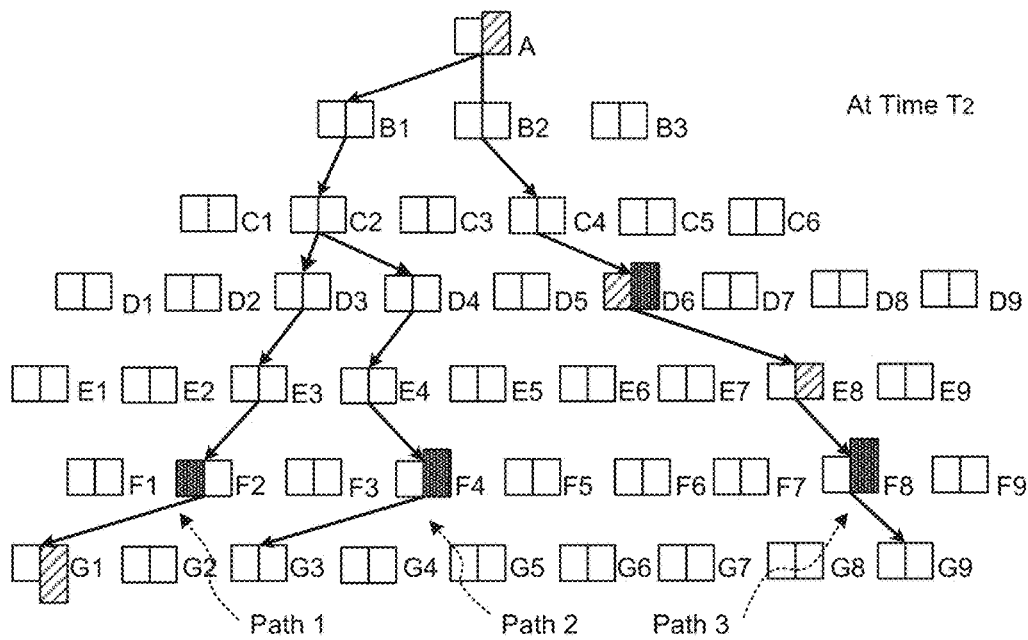
Figure 3C:
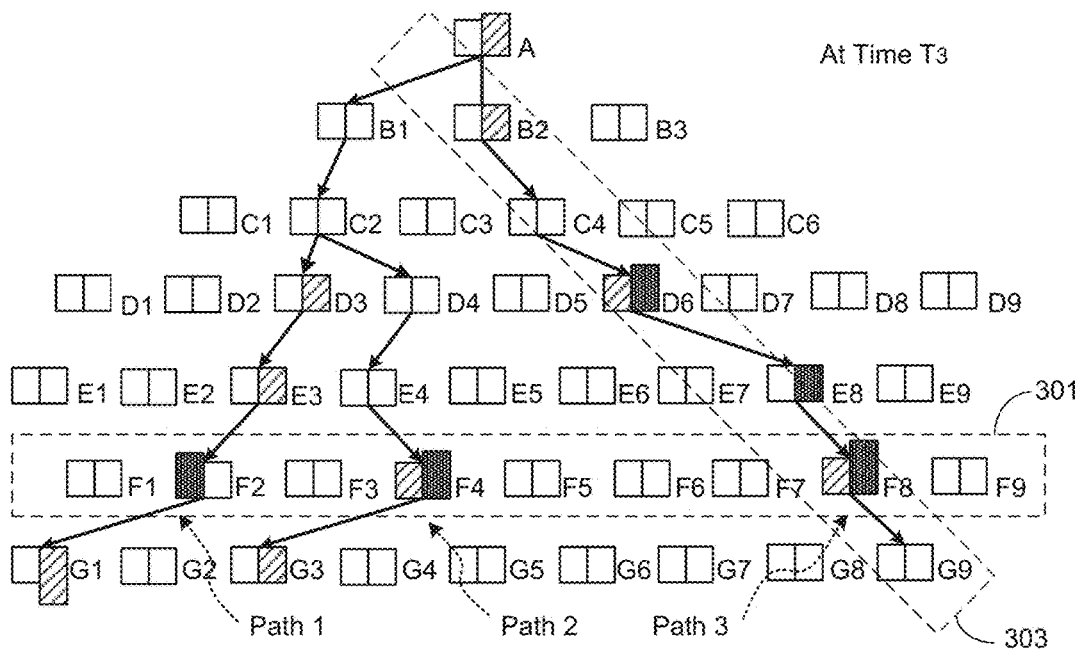

FIGS. 3A to 3C illustrate changes of quality of service (QoS) levels on DAG paths in the microservice-based application at time $t_1$, time $t_2$ and time $t_3$. These changes of QoS may cause associated change in quality of experience (QoE).

As illustrated, node A begins with a normal ERI and a normal RTI at time $t_1$. As time passes, node A has a normal ERI and a pre-warning level RTI at time $t_2$, and then a pre-warning level ERI and a warning level TI at time $t_3$.

In DAG path 1, for example, node G1 begins with a normal ERI and a pre-warning level RTI at time $t_1$. At time $t_2$, the pre-warning level RTI of node G1 becomes larger in size, representing an increased degradation in experience. At time $t_3$, the RTI of node G1 turns to a warning level status.

In DAG path 2, for example, node F4 starts with a pre-warning level RTI at time $t_1$. At time $t_2$, the RTI of node F4 turns to a warning level status. At time $t_3$, the warning level RTI of node F4 becomes larger in size, which represents further deterioration.

In DAG path 3, only node F8 initially has a RTI at time $t_1$. At time $t_2$, node D6 also has a warning level RTI and node F8 has a larger (i.e., more severe) warning level RTI. At time $t_3$, node E8 has also a warning level RTI as well as node D6 and node F8.

In the embodiments illustrated in FIGS. 3A to 3C, DAG path 3 suffers the most severe QoE degradation among DAG paths. Further, the sixth layer (comprising nodes F1 through F9) has three warning level statuses, indicating the most severe QoE degradation.

Figure 4A:
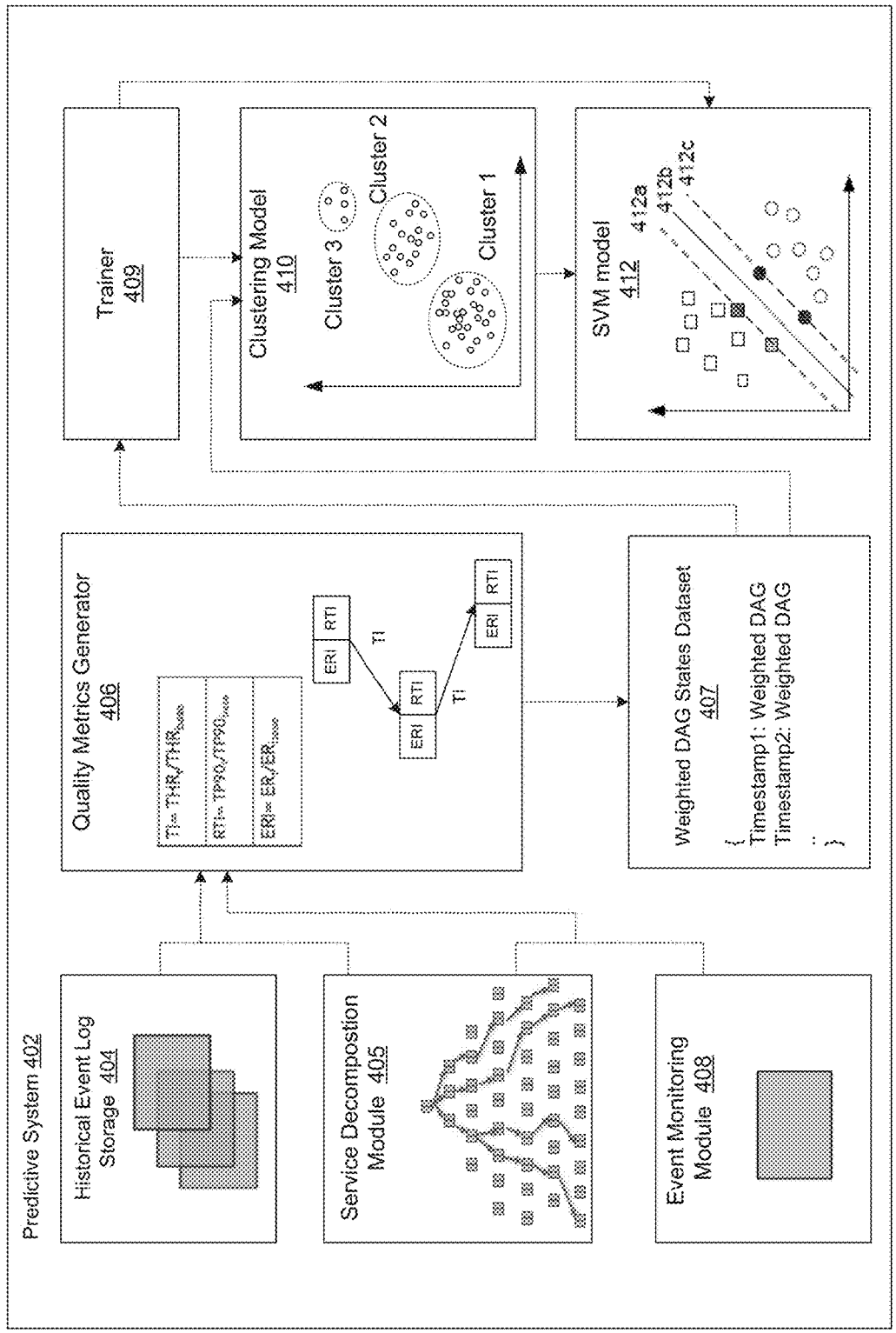
FIG. 4A depicts an example of a predictive system for predicting experience degradation events in a microservice-based application in accordance with aspects of the present disclosure.

FIG. 4A depicts an example of a predictive system 402 for predicting experience degradation in a microservice-based application in accordance with aspects of the present disclosure.

Predictive system 402 may include historical event log storage 404, a service decomposition module 405, a quality of service metrics generator 406, a weighted DAG states dataset 407, an event monitoring module 408, a trainer 409, a clustering model 410, and a support vector machine model 412. In one embodiment, the predictive system 402 is implemented on a server separate from multiple-layer nodes of the microservice-based application.

Historical event log storage 404 stores event log information including, for example, timestamps of each event occurrence, types of events, whether each API request was successfully processed, and/or processing times of API requests. In one embodiment, the historical event log storage 404 may store a fixed amount of historical data, for example, only the last 6 months of historical data.

Service decomposition module 405 may decompose each of various services offered by a microservice-based application into a series of microservices, and map each of the series of microservices to their corresponding nodes. Then, the service decomposition module 405 connects these corresponding nodes to form DAG paths for the each of the various services. In one embodiment, the service decomposition module 405 may store information on DAG paths for each service offered by the microservice-based application.

Quality of service metrics generator 406 derives quality of service metrics for each node based on their respective event logs (for example, stored in historical event log storage 404). In some embodiments, quality of service metrics include a response time index (RTI), an error rate index (ERI) and/or a throughput index (TI), as described above. Each quality of service metric can be determined at a specific frequency or interval (e.g., every minute) and stored over a specific time period so as to form a time-series of QoS metric data, e.g., at time $t_1$, $t_2$ . . . , $t_n$. For example, the quality of service metrics could be derived every 5 minutes and stored for up to 3 months. Many other intervals and time periods are also possible.

For example, a dataset for DAG path 1 (DAG 1) includes a collection of quality of service metrics for node A, node B1, node C2, node D3, node E3, node F2, and node G1. Thus, a quality of service metrics dataset for DAG path 1 at time t ($DAG1_t$) may be stored in a data structure, such as a vector, like the following: {[A, $RTI_t$, $ERI_t$, $TI_t$], [B1, $RTI_t$, $ERI_t$, $TI_t$], . . . , [G9, $RTI_t$, $ERI_t$, $TI_t$]}. Other DAG paths may be stored in similar data structures. In some cases, one quality of service metric may be generated for each DAG path for each measurement interval over a total observation interval, such as once every 10 minutes for the last 6 months. In this way, the quality of service metric dataset becomes a time-series of DAG performance. By storing a time-series of data on DAG performance, performance characteristics of the DAG may be analyzed, as further discussed below.

Quality of service metrics generator 406 may also generate DAG metrics, which may be stored in a data structure, such as a vector, like the following: {"timestamp1":"DAG1-state-1", "timestamp2":"DAG1-state-2", "timestamp3": "DAG1-state-3", . . . }, where DAG1-state-t means quality of service metrics properties of nodes (e.g., tuples of ERI, RTI and/or TI) for DAG path 1 at time t. The same format can be used for dataset of other DAG paths, such as DAG path 2, 3, . . . , n.

In another embodiment, DAG paths may be weighted based on a function of the QoS metrics. For example, a weight may be based on a function of one or more of the RTIs, ERIs, and TIs of the nodes in the DAG at a given time, or over a period of time. The function may take many forms, such as a simple mathematical function or a more complex model-based output based on the QoS metric inputs. The weight may therefore be a blended metric of the performance of a DAG based on more than one QoS metric. In some cases, the weighted DAG data may be stored in a data structure, such as a vector, as follows: [$wDAG1_{t1}$, $wDAG1_{t2}$, $wDAG1_{t3}$, $wDAG1_{t4}$, . . . , $wDAG1_{tm}$] for DAG path 1; [$wDAG2_{t1}$, $wDAG2_{t2}$, $wDAG2_{t3}$, $wDAG2_{t4}$, . . . , $wDAG2_{tm}$] for DAG path 2; [$wDAG3_{t1}$, $wDAG3_{t2}$, $wDAG3_{t3}$, $wDAG3_{t4}$, . . . , $wDAG3_{tm}$] for DAG path 3; and so on. The weights on the DAG paths can vary in range, for example, from 0.1 to 1.0, depending on their contribution level to the experience degradation.

The predictive system 402 includes a clustering model 410 for clustering quality of service metrics associated with each node, and a support vector machine model 412 for predicting experience degradation events that are expected to occur during operation of a microservice-based application. Each of these will be discussed in more detail below with respect to FIGS. 4B and 4C.

The predictive system 402 also may have a trainer 409 to train or learn the clustering model 410 and the support vector machine model 412, using the historical event log data and/or quality of service metrics dataset derived from the historical event log data.

Event monitoring module 408 receives substantially real-time event log information from each node, wherein the information includes, for example, timestamps of each event occurrence, types of events, a success or fail of processing an API request, and/or processing times of API requests.

Figure 4B:
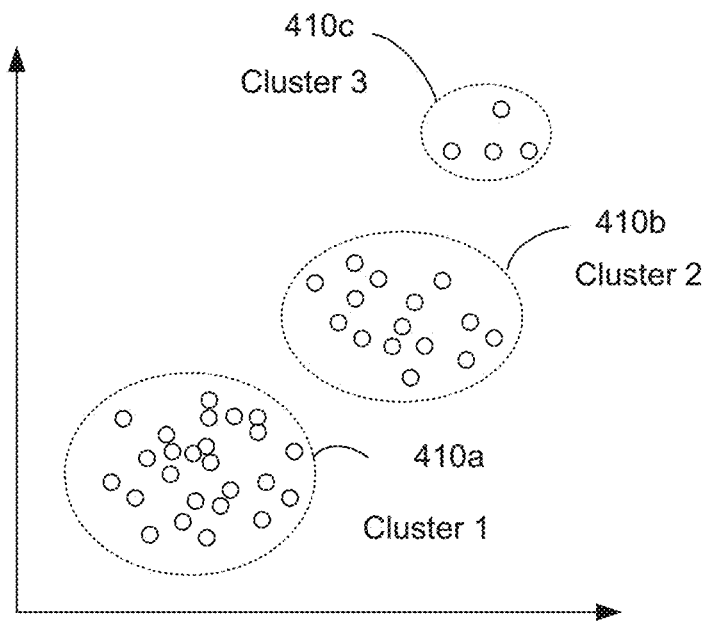
FIG. 4B depicts an example of clustering the quality of service metrics sets of weighted DAG paths with a clustering model in accordance with aspects of the present disclosure.

FIG. 4B illustrates an example of clustering the quality of service metrics sets with a clustering model 410 in accordance with aspects of the present disclosure.

Initially, the clustering model 410 receives quality of service metrics data sets from quality of service metrics generator 406 (as depicted in FIG. 4A). Then, clustering model 410 may apply a clustering algorithm to the received quality of service metrics data sets. The output of the clustering algorithm may be two or more clusters of quality of service metrics related to nodes on the DAG paths, as depicted in FIG. 4B by clusters 410a, 410b, and 410c. Notably, while only three clusters are shown, many are possible.

The clustering of QoS metric may lead to many insights based on the performance of a DAG. For example, the clustering results may reveal that certain nodes tend to have experience performance degradation at similar times. This sort of insight is possible because the QoS metric data is time-stamped. Further, the clustering may reveal performance dependencies between disparate nodes that do not appear to be related based on the DAG alone. For example, the clustering may reveal downstream performance degradation of one or more nodes in a DAG based on a performance issue at an upstream node. Thus, the clustering may reveal a set of nodes in a DAG that tend to have performance issues at the same or at similar times. This insight may be further explored with reference to the SVM model, described below with respect to FIG. 4C.

In one embodiment, the clustering model 410 may employ the K-means clustering algorithm. In general, the K-means clustering algorithm is used to partition n data into k clusters in which each data belongs to the cluster with the nearest mean, serving as a prototype of the cluster. Though any suitable clustering algorithm may be applied.

In one example, during the clustering process, the number of k clusters is determined based on the number of QoS levels (e.g., normal, pre-warning, or warning level). For example, if there are three QoS levels, then k is set to three (3). In the above embodiments in which the QoS levels include normal (or green), pre-warning (or yellow) and warning (red), the K-means clustering algorithm partitions the quality of service metrics into one of Clusters 1 (410a), 2 (410b) and 3 (410c). Cluster 1 (410a) may have a lower mean value of quality of service metrics (e.g., ERI and RTI) and can thus be mapped to a normal QoS level, which in turns means no or low experience degradation. Cluster 2 may have a middle mean value of quality of service metrics (e.g., ERI and RTI) and can thus be mapped to a pre-warning QoS level, which may relate to an intermediate experience degradation level. Cluster 3 may have a higher mean value of quality of service metrics (e.g., ERI and RTI) and can thus be mapped to a warning QoS level status, which may relate to a severe experience degradation level.

In some cases, the number of clusters may be set such that each QoS metric (e.g., RTI, ERI, and TI) is associated with the number of service levels (e.g., normal, pre-warning, and warning) such that the total number of clusters is equal to the number of QoS metrics times the number of different service levels, i.e., nine in this case.

These multiple severity levels may be determined, for example, based on quality of service (QoS) requirements defined in the service level agreement (SLA). Alternatively, the QoS requirements may be based on internal organizational standards or metrics.

Once the clustering process is complete, the resultant clusters may be analyzed to determine the value ranges of ERIs, RTIs, and TIs for each of the QoS levels. Further, the data within each cluster may further be labelled as one of normal QoS status, pre-warning QoS level status, and warning QoS level status based on the cluster in which it fell.

The clustering model may output DAG QoS metrics data including temporal attributes including timestamps with discrete intervals and dynamic attributes, including QoS levels. For example, a discrete interval may be a 30 minute interval such as 12:00-12:30 am. Thus, a specific QoS level may be associated with a certain time interval, which provides temporal performance information.

The DAG QoS metrics data also may include static/structural attributes of the DAG including attributes of microservice (nodes), and relationships (e.g., edges, connections, paths through the DAG). Attributes of paths or connections may include a workflow path of services such as an invoice, search, vendors, employee time tracking, login and home dashboard, and so on; and a depth or microservice hierarchy level such as layer 1-client, layer 2-identity services, layer 3-shell services such as QuickBooks® online (QBO), layer 4-platform services, layer 5-database and so on. Attributes of nodes may include a product feature area such as accounting, payments, payroll, self employed, product sub area such as harmony/user interface (UI) APIs, V3 APIs, V4 APIs, and library name/github location such as a list of github project module location.

Figure 4C:
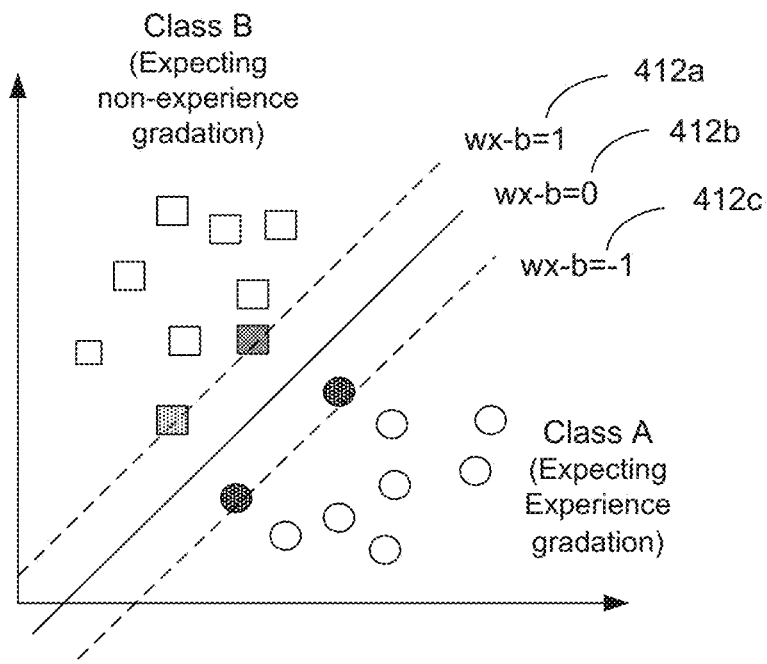
FIG. 4C depicts an example of classifying quality of service metrics related points into two classes using a hyperplane of the support vector machine (SVM) model in accordance with aspects of the present disclosure.

FIG. 4C illustrates an example of classifying quality of service metrics related vectors into two classes by a hyperplane of a support vector machine model, such as 412 shown in FIG. 4A, in accordance with aspects of the present disclosure.

Predictive system 402 may include a support vector machine model 412 into which the above QoS metrics data sets are fed as inputs. Support vector machine (SVM) model 412 analyzes the QoS metric data for classification and regression analysis. In general, the SVM model may apply a kernel function to map input vectors into a multi-dimensional feature space. Then, SVM model can define a hyperplane in the multi-dimensional space that separates feature vector points in a class from feature vector points outside the class. The hyperplane may be parameterized by a set of support vectors and a set of corresponding weighting coefficients.

In the embodiment, the SVM model 412 applies a kernel function on the labeled quality of service metrics dataset, and obtains n vector points of $\vec{x}_1, \ldots, \vec{x}_n$ in multi-dimensional space. The SVM model 412 finds a hyperplane dividing the group of $\vec{x}_l$ points for one class from the group of points for another class. A hyperplane can be written as the set of points $\vec{x}_l$ satisfying: $\vec{w} \cdot \vec{x} - b = 0$, where $\vec{w}$ is the normal vector to the hyperplane. The parameter $$\frac{b}{\|\vec{w}\|}$$

determines the offset of the hyperplane from the origin along the normal vector $\vec{w}$.

As illustrated in FIG. 4C, an optimal hyperplane 412b divides vector points into Class A represented by circle points, and Class B represented by rectangular points. Sample points on the margin are called the support vectors. In one embodiment, Class A expects an experience degradation event and Class B is not expecting experience degradations. Hyperplanes 412a, 412c correspond to $\vec{w}\cdot\vec{x}-b=-1$ and $\vec{w}\cdot\vec{x}-b=+1$, respectively. Hyperplane 412b corresponds to $\vec{w}\cdot\vec{x}-b=0$ and is intermediate of hyperplanes 412a, 412c.

In the training phase, the SVM model 412 receives a historical quality of service metrics dataset as a training data set that is transformed into a multi-dimensional space. Then, support vectors and associated weights are determined for an optimal multi-dimensional hyperplane. The parameters of the SVM model 412 may be trained by mapping the input vectors into a multi-dimensional space and constructing an optimal separating hyperplane in the multi-dimensional space.

Once the SVM model 412 has been trained, the predictive system 402 receives real-time event log data incoming from the microservice-based application. Then, the predictive system 402 derives QoS metrics from incoming real-time event log data, and labels the incoming real-time quality of service metrics with, e.g., normal, pre-warning or warning QoS level statuses. Consequently, the predictive system 402 generates a hyperplane for temporal/dynamic attributes (vectors) and any or more of static/structural attributes (vectors), which provides insights given a large training set (for example, past one year of operational data which is readily available from metrics/monitoring data stores). With the generated hyperplane, the predictive system 402 may predict various experience degradation events being expected to occur SVM model 412 based on the incoming real-time quality of service metrics dataset. Some of embodiments of predicting experience degradation events are disclosed as examples below.

In one embodiment, the SVM model 412 predicts one node at which the microservice-based application is expected to have the warning status more frequently than a threshold amount of time in a time interval. This prediction is made by using a hyperplane separating the node with warning status frequently occurring more than the threshold amount of time in the time interval from the other otherwise nodes. For example, the SVM model 412 can predict that node G1 may have more warning statuses occur than the threshold number within next 30 minutes.

In another embodiment, the SVM model 412 may predict which layer of the microservice architecture in which the warning status is expected to occur more frequently than the threshold amount of time in a time interval. This prediction can be made by using a hyperplane to separate one layer predicted to have the warning status on its nodes more frequently than the threshold amount of time in the time interval from other layers. For example, the SVM model 412 can predict the sixth layer where warning statuses are expected to occur on its nodes most frequently between 1 PM to 2 PM on a particular day as depicted in FIG. 3C.

In yet another embodiment, the SVM model 412 may predict one DAG path where the warning statuses on the nodes of the DAG path are expected to occur more frequently than a threshold amount of time in a certain time interval. This prediction can be made by using a hyperplane separating the DAG path having warning statuses on its nodes more frequently than the threshold time in the certain time from the other DAG paths. For example, the SVM model 412 can predict that DAG path 3 is expected to have most frequent warning statuses in a particular week.

In yet another embodiment, the SVM model 412 may predict one range of dates and/or times during which the warning or red statuses are expected to occur with respect to a certain node or path more frequently than a threshold amount of time in a time interval, based on the labeled incoming quality of service metrics. This prediction can be made by using a hyperplane separating one range of dates and/or times during which warning statuses are expected to occur more frequently than other ranges. For example, the SVM model 412 can predict that the frequent warning statuses are expected to occur on the DAG path 1 between 9 AM and 12 Noon on a particular date in the future.

The SVM model 412 may find an association relationship between experience degradation events of DAG paths. In one embodiment, the SVM model 412 may predict a DAG path in which the warning status is expected to occur during a time interval when a different DAG path has the warning status. This prediction can be made by a hyperplane separating the DAG path having the warning status during the time interval from the other DAG paths when the other DAG paths had the warning status status during a past time interval. For example, the SVM model 412 may predict that whenever the warning status appears on a particular DAG path (e.g., DAG path 2 for a transaction categorization service) more than a threshold number of times (e.g., three times) in a time interval (e.g., 10 minutes), another DAG path (e.g., DAG path 1 for an online content service) is also expected to suffer the warning status during the time interval (i.e., in next 10 minutes). This association relationship of experience degradation events can be found between DAG paths which share common nodes.

Figure 5:
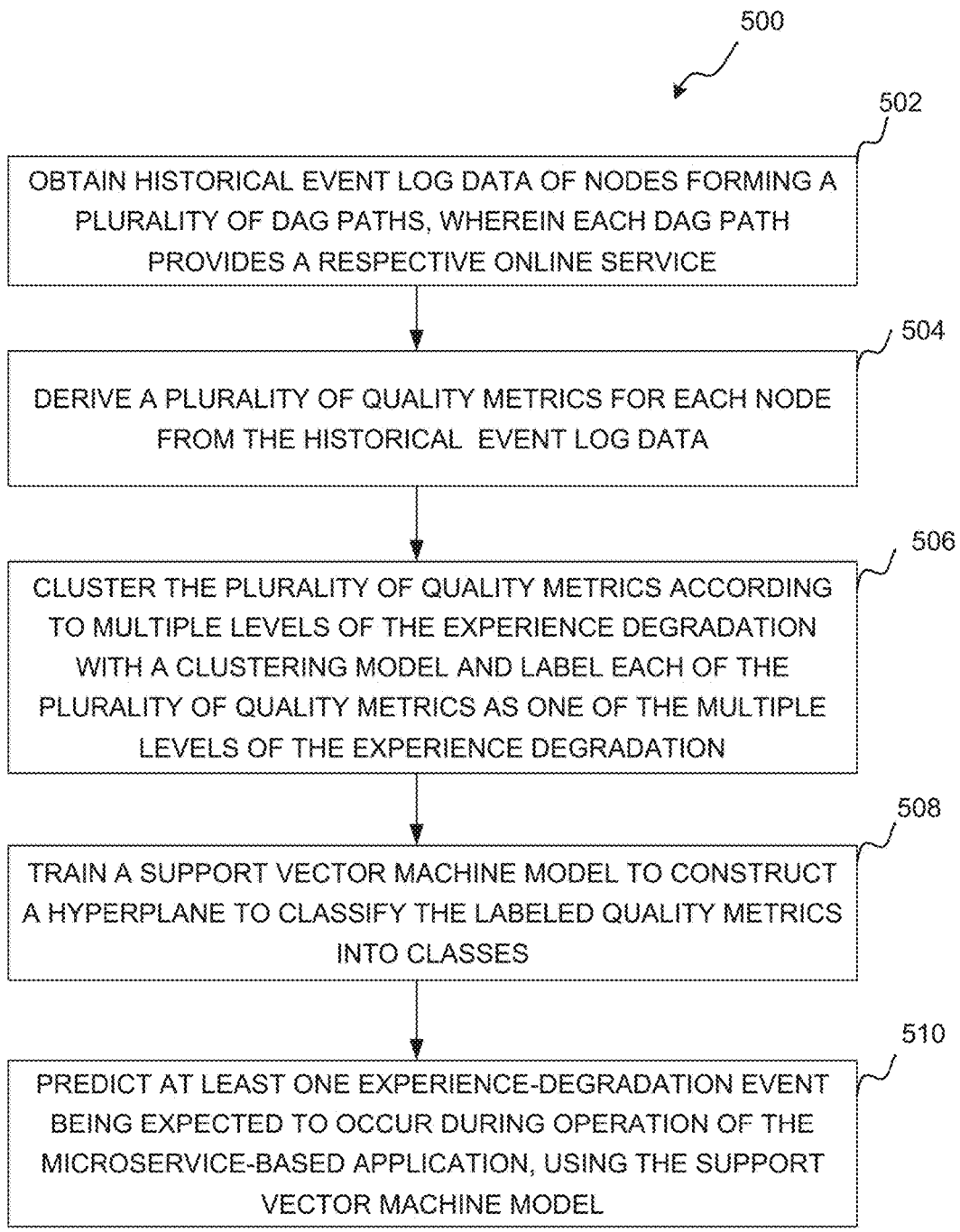
FIG. 5 depicts an exemplary method for predicting experience degradation events in a microservice-based application comprising a plurality of microservices that are supported by multiple-layer nodes in accordance with aspects of the present disclosure.

FIG. 5 depicts a method 500 for predicting experience degradation events in a microservice-based application comprising a plurality of microservices that are supported by multiple-layer nodes.

The method 500 begins at step 502, with obtaining historical event log data of nodes forming a plurality of directed acyclic graph (DAG) paths, wherein each DAG path provides a respective online service.

For example, the historical event log data includes timestamps of each event occurrence, types of APIs, whether each API request was successfully processed, and/or processing times of API requests.

The method 500 then proceeds to step 504, where a plurality of quality of service metrics for each node are derived based on the historical event log data. For example, the plurality of quality of service metrics for each node include a response time index (RTI) indicating that how quickly a node provides an API response to an API request, an error rate index (ERI) suggesting an error rate of API traffic between two communicating nodes and a throughput index (TI) indicating an amount of API traffic between two communicating nodes.

The method 500 then proceeds to step 506, where a clustering algorithm clusters the plurality of quality of service metrics into a plurality of quality of service metrics clusters. Based on each size of the clusters, respective value ranges of each quality of service metric are determined for the multiple levels of experience degradation, and each of the plurality of quality of service metrics is labeled as one of the multiple levels of quality of experience according to the respective value ranges.

For example, RTIs, ERIs and TIs may be labeled based on the quality of service levels. The severity levels of experience degradation may include a normal level or a lower severity or green status, a pre-warning level or an intermediate severity or yellow status, and/or a warning level or a high severity or red status.

The method 500 then proceeds to step 508, where a support vector machine (SVM) model is trained to construct a hyperplane to classify the labeled quality of service metrics into classes. For example, the parameters of the SVM model may be trained by mapping the input vectors of quality of service metrics into a multi-dimensional space and constructing an optimal separating hyperplane in the multi-dimensional space.

The method 500 then proceeds to step 510, where the SVM model predicts various experience degradation events being expected to occur during operation of the microservice-based application.

Figure 6:
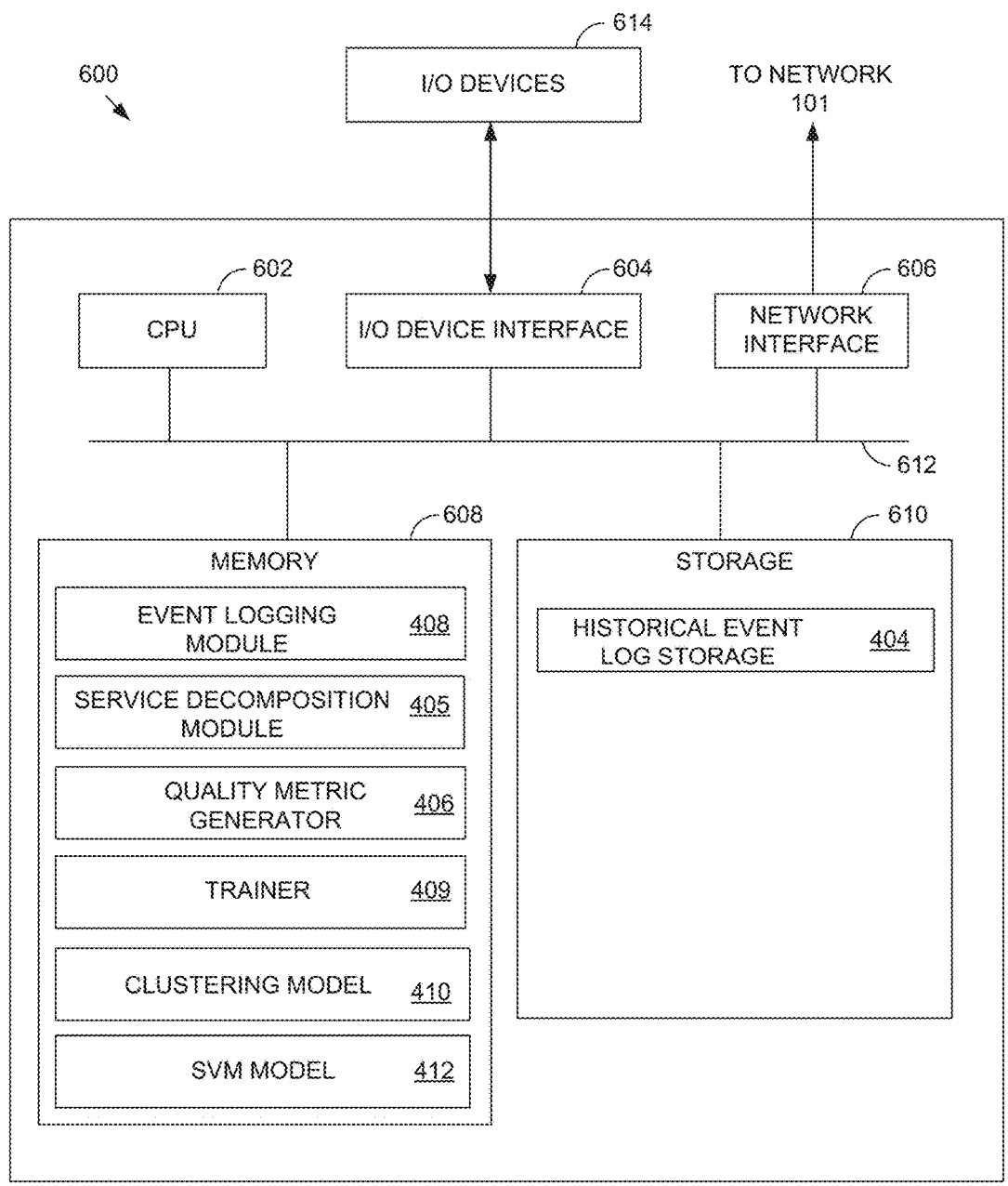
FIG. 6 depicts an exemplary configuration of a server that is configured to implement methods described in accordance with aspects of the present disclosure.

FIG. 6 illustrates an exemplary configuration of a server 600 that is configured to implement methods described herein, such as the method of predicting experience degradation in a microservice-based application comprising a plurality of microservices that are supported by multiple-layer nodes, as discussed above with respect to FIG. 4A.

As shown, the server 600 includes: a central processing unit (CPU) 602 for executing programming instructions; one or more input/output (I/O) device interfaces 604, which may allow for the connection of various I/O devices 614 (e.g., keyboards, displays, mouse devices, pen input, etc.); network interface 606, which may include, for example, a transceiver for transmitting and receiving data from an external network, such as network 101; a memory 608, such as a volatile random access memory; a storage 610, such as a non-volatile disk drive, RAID array, etc.; and an interconnect 612, such as a data bus. In some examples, some or all of storage 610 may be remote from server 600 and may instead be accessed via network interface 606.

CPU 602 may retrieve and execute executable instructions stored in memory 608 via interconnect 612. In this example, memory 608 includes program code for implementing predictive system (as described above with respect to FIG. 4A), including a quality of service metric generator 406, a clustering model 410 and a support vector machine model 412. Memory 608 may further include program code for implementing the event logging module 408, such as described with respect to FIG. 1.

CPU 602 may also retrieve and process data from storage 610. In this example, storage 610 includes historical event log data, such as described with respect to FIG. 4A.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

While the foregoing is directed to embodiments of the present disclosure, other and further embodiments of the disclosure may be devised without departing from the basic scope thereof, and the scope thereof is determined by the claims that follow.

What is claimed is:

1. A method of predicting experience degradation events in a microservice-based application comprising a plurality of microservices, the method comprising:

obtaining historical event log data associated with a plurality of nodes forming a plurality of directed acyclic graph (DAG) paths, wherein each respective DAG path of the plurality of DAG paths provides a respective online service;

deriving a plurality of quality of service metrics for each node of the plurality of nodes from the historical event log data, wherein the plurality of DAG paths are weighted based on at least a subset of the plurality of quality of service metrics for each node of the plurality of nodes;

clustering the plurality of quality of service metrics with a clustering algorithm to create a plurality of quality of service metrics clusters;

determining value ranges of each quality of service metric cluster of the plurality of quality of service metrics clusters for multiple levels of quality of experience and labeling each of the plurality of quality of service metrics as one of the multiple levels of quality of experience according to the value ranges of each quality of service metric cluster to produce labeled quality of service metrics;

training a support vector machine model to construct a hyperplane to classify the labeled quality of service metrics into two or more classes; and predicting at least one experience degradation event being expected to occur during operation of the microservice-based application, using the support vector machine model, by:

receiving incoming event log data of the nodes forming the plurality of DAG paths;

deriving an incoming quality of service metrics dataset for each node from the incoming event log data;

labeling the incoming quality of service metrics dataset with one of multiple levels of quality of experience to produce a labeled incoming quality of service metrics dataset; and providing the labeled incoming quality of service metrics dataset to the support vector machine model.

2. The method of claim 1, wherein the clustering algorithm comprises a K-means clustering algorithm.

3. The method of claim 1, wherein the plurality of quality of service metrics include:
   a response time index indicating that how quickly a node provides an API response to an API request;
   an error rate index suggesting an error rate of API traffic between two communicating nodes; or
   and a throughput index indicating an amount of API traffic between two communicating nodes.

4. The method of claim 1, further comprising: predicting which node at which a higher level of experience degradation is expected to occur in a first threshold time with the support vector machine model.

5. The method of claim 1, further comprising: predicting a node layer in which the at least one experience degradation event is predicted to occur.

6. The method of claim 1, further comprising: predicting a time range in which the microservice-based application is expected to experience a warning status.

7. The method of claim 1, further comprising: predicting a DAG path in which the at least one experience degradation event is predicted to occur.

8. The method of claim 1, further comprising: predicting a first DAG path in which a warning status is expected to occur in a threshold time, when a warning status occurs in a second DAG path.

9. An apparatus for predicting experience degradation events in a microservice-based application comprising a plurality of microservices that are supported by multiple-layer nodes, comprising:
   a memory comprising executable instructions; and
   a processor in data communication with the memory and configured to execute the executable instructions that, when executed, cause the apparatus to perform a method, the method comprising:
      obtaining historical event log data associated with a plurality of nodes forming a plurality of directed acyclic graph (DAG) paths, wherein each respective DAG path of the plurality of DAG paths provides a respective online service;
      deriving a plurality of quality of service metrics for each node of the plurality of nodes from the historical event log data, wherein the plurality of DAG paths are weighted based on at least a subset of the plurality of quality of service metrics for each node of the plurality of nodes;
      clustering the plurality of quality of service metrics with a clustering algorithm to create a plurality of quality of service metrics clusters;
      determining value ranges of each quality of service metric cluster of the plurality of quality of service metrics clusters for multiple levels of quality of experience and labeling each of the plurality of quality of service metrics as one of the multiple levels of quality of experience according to the value ranges of each quality of service metric cluster to produce labeled quality of service metrics;
      training a support vector machine model to construct a hyperplane to classify the labeled quality of service metrics into two or more classes; and
      predicting at least one experience degradation event being expected to occur during operation of the microservice-based application, using the support vector machine model, by:
         receiving incoming event log data of the nodes forming the plurality of DAG paths;
         deriving an incoming quality of service metrics dataset for each node from the incoming event log data;
         labeling the incoming quality of service metrics dataset with one of multiple levels of quality of experience to produce a labeled incoming quality of service metrics dataset; and
         providing the labeled incoming quality of service metrics dataset to the support vector machine model.

10. The apparatus of claim 9, wherein the clustering algorithm comprises a K-means clustering algorithm.

11. The apparatus of claim 9, wherein the plurality of quality of service metrics include a response time index indicating that how quickly a node provides an API response to an API request, an error rate index suggesting an error rate of API traffic between two communicating nodes and a throughput index indicating an amount of API traffic between two communicating nodes.

12. The apparatus of claim 9, wherein the processor is further configured to cause the apparatus to:
   predict a node at which a higher level of experience degradation is expected to occur in a first threshold time with the support vector machine model.

13. The apparatus of claim 9, wherein the processor is further configured to cause the apparatus to:
   predict a node layer in which the at least one experience degradation event is predicted to occur.

14. The apparatus of claim 9, wherein the processor is further configured to cause the apparatus to:
   predict a time range in which the microservice-based application is expected to experience a warning status.

15. The apparatus of claim 9, wherein the processor is further configured to cause the apparatus to:
   predict a DAG path in which the at least one experience degradation event is predicted to occur.

16. The apparatus of claim 9, wherein the processor is further configured to cause the apparatus to: predict a first DAG path in which a warning status is expected to occur in a threshold time, when a warning status occurs in a second DAG path.

\* \* \* \* \*